No. 808,429. PATENTED DEC. 26, 1905.
J. L. BOISVERT.
SPITTOON.
APPLICATION FILED JULY 15, 1905.
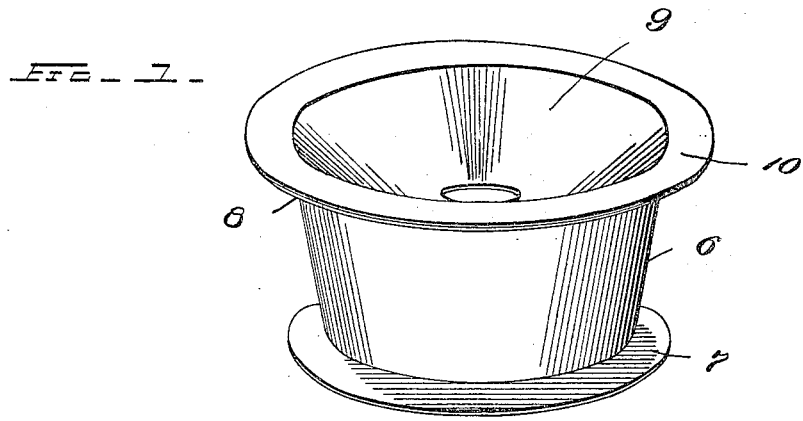
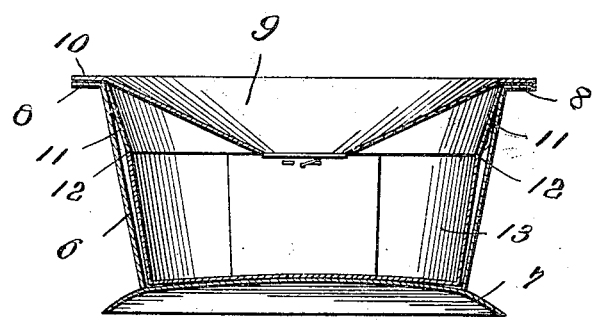
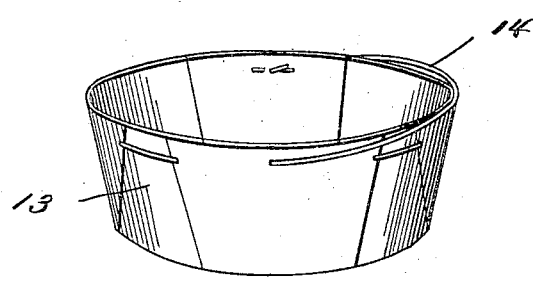
WITNESSES
INVENTOR
Joseph L. Boisvert
BY Milo B. Stevens & Co.
Attorneys

UNITED STATES PATENT OFFICE.

JOSEPH L. BOISVERT, OF KANKAKEE, ILLINOIS.

SPITTOON.

No. 808,429.　　　Specification of Letters Patent.　　　Patented Dec. 26, 1905.

Application filed July 15, 1905. Serial No. 269,763.

*To all whom it may concern:*

Be it known that I, JOSEPH L. BOISVERT, a citizen of the United States, residing at Kankakee, in the county of Kankakee and State of Illinois, have invented new and useful Improvements in Spittoons, of which the following is a specification.

This invention is an improved spittoon of that class having an inner receptacle or cup made of asbestos, paper, or the like which can be removed and thrown away or burned, enabling the spittoon to be cleaned without washing.

The construction will be found serviceable and safe for use in cases of diphtheria, tuberculosis, or other contagious affections.

The article is illustrated in the accompanying drawings, Figure 1 being a perspective view thereof, and Fig. 2 a central vertical section. Fig. 3 is a perspective view of the inner cup or bucket removed.

Referring specifically to the drawings, the pan of the spittoon has inclined sides 6 and an extended bottom 7. At the upper edge the sides are provided with an outwardly-extending substantially horizontal flange 8, which is serviceable in lifting the spittoon, as hereinafter described.

The funnel-shaped cover of the spittoon is indicated at 9, and the rim 10 of this cover is extended to fit and rest upon the flange 8. The cover has a depending ring 11, which fits within the pan at the top thereof. This ring serves to hold the cover in place and also to hold the paper bucket in position within the pan, as the lower edge of the ring rests upon the top edge of the bucket, as shown at 12 in the sectional view.

The removable bucket or receptacle is indicated at 13. This fits within the pan and is preferably made of asbestos, so that it will not take fire from burned matches thrown in the spittoon, and also that it may be purified by fire and used repeatedly, if necessary. The bucket may, however, be made of paper and thrown away or burned and a new one supplied when necessary. The bucket has a bail 14, whereby it may be carried.

The flanges 8 and 10 afford convenient means for carrying the pan and the cover without danger of the cover sliding off, as the flanges may be grasped by the hand and held together when the spittoon is lifted. The inner depending ring on the cover holds the bucket in place while the spittoon is being carried or moved. The pan is also capable of use as an ordinary spittoon without the cover and bucket, if so desired.

What I claim as new, and desire to secure by Letters Patent, is—

A spittoon comprising a pan having an outwardly-extending flange at its upper edge, and a cover upon the pan having an extended rim which rests upon the flange, so that both may be grasped together, and having a depending ring which fits within the pan and lies against the side wall thereof, and a removable receptacle which fits within the pan against the side wall thereof and upon the upper edge of which the depending ring rests.

In testimony whereof I have signed my name to this specification in the presence of two subscribing witnesses.

JOSEPH L. BOISVERT.

Witnesses:
　J. MAUDE SCHNEIDER,
　HENRY F. RUEL.